United States Patent
Weeks et al.

(10) Patent No.: US 9,650,935 B2
(45) Date of Patent: May 16, 2017

(54) MOUNTING MAT

(75) Inventors: Kelvin Weeks, Runcorn (GB); Adam Kelsall, Runcorn (GB)

(73) Assignee: Saffil Automotive Limited, Sheffield, South Yorkshire (GB)

(*) Notice: Subject to any disclaimer, the term of this patent is extended or adjusted under 35 U.S.C. 154(b) by 911 days.

(21) Appl. No.: 13/513,129

(22) PCT Filed: Dec. 1, 2010

(86) PCT No.: PCT/GB2010/052006
§ 371 (c)(1),
(2), (4) Date: Jun. 21, 2012

(87) PCT Pub. No.: WO2011/067598
PCT Pub. Date: Jun. 9, 2011

(65) Prior Publication Data
US 2012/0269993 A1  Oct. 25, 2012

(30) Foreign Application Priority Data

Dec. 1, 2009 (GB) .................... 0921055.0
Apr. 7, 2010 (GB) .................... 1005785.9

(51) Int. Cl.
*B32B 1/08* (2006.01)
*B32B 5/06* (2006.01)
(Continued)

(52) U.S. Cl.
CPC .............. *F01N 3/2864* (2013.01); *B32B 3/06* (2013.01); *B32B 3/16* (2013.01); *B32B 5/022* (2013.01);
(Continued)

(58) Field of Classification Search
CPC .. B32B 3/06; B32B 3/16; B32B 5/022; B32B 5/06; B32B 5/26; B32B 7/12; B32B 7/14;
(Continued)

(56) References Cited

U.S. PATENT DOCUMENTS 3,012,923 A   12/1961  Slayter
3,510,394 A    5/1970  Cadotte
(Continued)

FOREIGN PATENT DOCUMENTS

CN   1222219 A   7/1999
CN   1968806 A   5/2007
(Continued)

OTHER PUBLICATIONS

Chinese Office Action for corresponding foreign application, mailed on Mar. 26, 2014.
(Continued)

*Primary Examiner* — Patricia L Nordmeyer
(74) *Attorney, Agent, or Firm* — Curatolo Sidoti Co., LPA; Joseph G. Curatolo; Vincent A. Cortese

(57) ABSTRACT

A mat for mounting a monolith, the mat comprising a first inorganic fiber layer, where the mat has a front edge intended to form a gas facing edge in use, a rear edge opposite thereto and side edges extending between the front and rear edges, wherein the first inorganic fiber layer at a first side edge of the mat, and/or at a second side edge of the mat is cut at an acute angle to the thickness direction of the mat.

24 Claims, 7 Drawing Sheets

Figure 1:
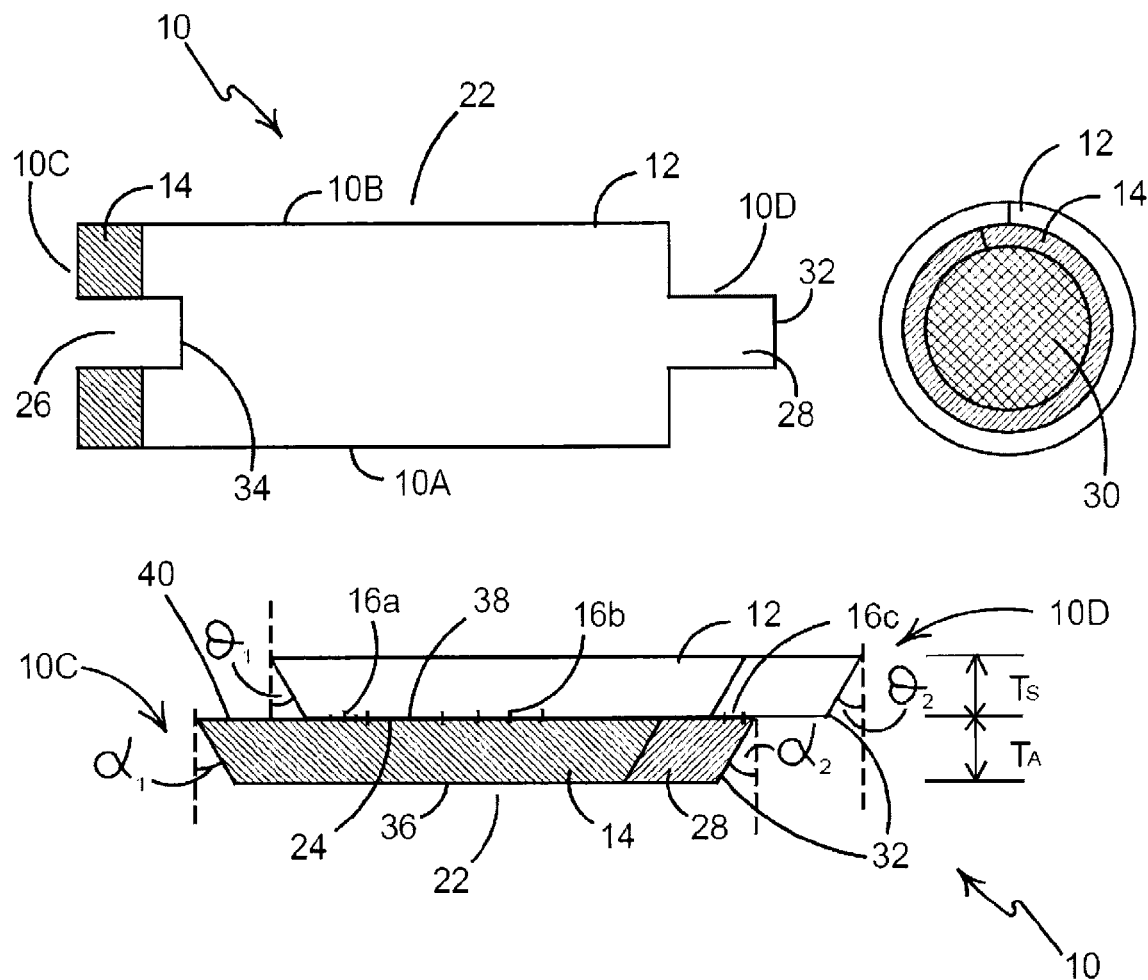

(51) Int. Cl.
- *B32B 37/12* (2006.01)
- *B32B 3/08* (2006.01)
- *B32B 37/14* (2006.01)
- *B32B 7/12* (2006.01)
- *B32B 5/02* (2006.01)
- *F01N 3/28* (2006.01)
- *B32B 3/06* (2006.01)
- *B32B 3/16* (2006.01)
- *B32B 5/26* (2006.01)
- *B32B 7/14* (2006.01)

(52) U.S. Cl.
CPC .................. *B32B 5/06* (2013.01); *B32B 5/26* (2013.01); *B32B 7/12* (2013.01); *B32B 7/14* (2013.01); *F01N 3/2853* (2013.01); *F01N 3/2857* (2013.01); *B32B 2262/10* (2013.01); *B32B 2262/105* (2013.01); *B32B 2605/08* (2013.01); *F01N 2350/04* (2013.01); *Y10T 156/10* (2015.01); *Y10T 428/13* (2015.01); *Y10T 428/14* (2015.01); *Y10T 428/192* (2015.01); *Y10T 428/24752* (2015.01); *Y10T 428/24777* (2015.01)

(58) Field of Classification Search
CPC .......... B32B 2262/10; B32B 2262/105; B32B 2605/08; F01N 3/2853; F01N 3/2857; F01N 3/2864; F01N 2350/04
USPC ..... 428/33, 192, 77, 40.1, 189, 78, 34.1, 58; 156/60, 327, 332, 336, 277
See application file for complete search history.

(56) References Cited

U.S. PATENT DOCUMENTS

| | | | |
|---|---|---|---|
| 3,649,406 A | 3/1972 | McNish |
| 3,674,621 A | 7/1972 | Miyamoto et al. |
| 3,771,967 A | 11/1973 | Nowak |
| 3,798,006 A | 3/1974 | Balluff |
| 3,957,573 A | 5/1976 | Miyamoto et al. |
| 3,996,145 A | 12/1976 | Hepburn |
| 4,011,651 A | 3/1977 | Bradbury et al. |
| 4,093,423 A | 6/1978 | Neumann |
| 4,101,280 A | 7/1978 | Frietzsche et al. |
| 4,142,864 A | 3/1979 | Rosynsky et al. |
| 4,271,228 A | 6/1981 | Foster et al. |
| 4,279,864 A | 7/1981 | Nara et al. |
| 4,328,187 A | 5/1982 | Musall et al. |
| 4,335,077 A | 6/1982 | Santiago et al. |
| 4,353,872 A | 10/1982 | Midorikawa |
| 4,385,135 A | 5/1983 | Langer et al. |
| 4,447,345 A | 5/1984 | Kummermehr et al. |
| 4,617,176 A | 10/1986 | Merry |
| 4,693,338 A | 9/1987 | Clerc |
| 4,752,515 A | 6/1988 | Hosoi et al. |
| 4,823,845 A | 4/1989 | Martin et al. |
| 4,849,382 A | 7/1989 | Shibata et al. |
| 4,863,700 A | 9/1989 | Ten Eyck |
| 4,927,608 A | 5/1990 | Wörner et al. |
| 4,929,429 A | 5/1990 | Merry |
| 4,985,212 A | 1/1991 | Kawakami et al. |
| 5,002,836 A | 3/1991 | Dinwoodie et al. |
| 5,073,432 A | 12/1991 | Horikawa et al. |
| 5,094,074 A | 3/1992 | Nishizawa et al. |
| 5,139,615 A | 8/1992 | Conner et al. |
| 5,151,253 A | 9/1992 | Merry et al. |
| 5,250,269 A | 10/1993 | Langer |
| 5,290,522 A | 3/1994 | Langer et al. |
| 5,380,580 A | 1/1995 | Langer et al. |
| 5,419,975 A | 5/1995 | Lintz et al. |
| 5,453,116 A | 9/1995 | Fischer et al. |
| 5,488,826 A | 2/1996 | Paas |
| 5,567,536 A | 10/1996 | Lintz et al. |
| 5,862,590 A | 1/1999 | Sakashita et al. |
| 5,882,608 A | 3/1999 | Sanocki et al. |
| 6,000,131 A | 12/1999 | Schmitt |
| 6,051,193 A | 4/2000 | Langer et al. |
| 6,101,714 A | 8/2000 | Schmitt |
| 6,162,404 A | 12/2000 | Tojo et al. |
| 6,251,224 B1 | 6/2001 | Dong |
| 6,267,843 B1 | 7/2001 | Helwig et al. |
| 6,317,976 B1 | 11/2001 | Aranda et al. |
| 6,468,932 B1 | 10/2002 | Robin et al. |
| 6,589,488 B1 | 7/2003 | Eyhorn |
| 6,613,294 B2 | 9/2003 | Sanocki et al. |
| 6,726,884 B1 | 4/2004 | Dillon et al. |
| 6,737,146 B2 | 5/2004 | Schierz et al. |
| 6,756,107 B1 | 6/2004 | Schierz et al. |
| 6,923,942 B1 | 8/2005 | Shirk et al. |
| 7,153,796 B2 | 12/2006 | Jubb et al. |
| 7,261,864 B2 | 8/2007 | Watanabe |
| 7,387,822 B2 | 6/2008 | Dinwoodie |
| 7,501,099 B2 | 3/2009 | Sanocki et al. |
| 7,550,118 B2 | 6/2009 | Merry |
| 7,820,117 B2 | 10/2010 | Peisert et al. |
| 7,850,927 B2 | 12/2010 | Takeuchi |
| 8,268,255 B2 | 9/2012 | Yoshimi et al. |
| 8,328,986 B2 | 12/2012 | Kariya |
| 2001/0036427 A1 | 11/2001 | Yamada et al. |
| 2002/0025904 A1 | 2/2002 | Goto et al. |
| 2002/0127154 A1 | 9/2002 | Foster et al. |
| 2002/0189097 A1 | 12/2002 | Collins et al. |
| 2003/0049180 A1 | 3/2003 | Fukushima |
| 2003/0185724 A1 | 10/2003 | Anji et al. |
| 2004/0052694 A1 | 3/2004 | Nishikawa et al. |
| 2004/0234436 A1 | 11/2004 | Howorth |
| 2005/0232828 A1 | 10/2005 | Merry |
| 2005/0272602 A1 | 12/2005 | Ninomiya |
| 2006/0154040 A1 | 7/2006 | Merry |
| 2006/0257298 A1 | 11/2006 | Merry |
| 2006/0278323 A1 | 12/2006 | Eguchi |
| 2007/0048196 A1* | 3/2007 | Takeuchi .................. 422/179 |
| 2007/0065349 A1 | 3/2007 | Merry |
| 2007/0207069 A1 | 9/2007 | Kariya et al. |
| 2008/0253939 A1 | 10/2008 | Hornback |
| 2009/0114097 A1 | 5/2009 | Saiki |
| 2009/0304560 A1 | 12/2009 | Dietz |
| 2010/0207298 A1 | 8/2010 | Kunze et al. |
| 2010/0209306 A1 | 8/2010 | Kunze et al. |

FOREIGN PATENT DOCUMENTS

| | | |
|---|---|---|
| CN | 101152774 A | 4/2008 |
| CN | 100534782 C | 9/2009 |
| CN | 101566086 A | 10/2009 |
| DE | 39 25 845 A1 | 2/1991 |
| DE | 102004056804 A1 | 6/2006 |
| EP | 0 205 704 A1 | 12/1986 |
| EP | 0 279 511 A2 | 8/1988 |
| EP | 0 319 299 A2 | 6/1989 |
| EP | 0 398 130 A2 | 11/1990 |
| EP | 0 465 203 A1 | 1/1992 |
| EP | 0 765 993 A1 | 4/1997 |
| EP | 0 803 643 A1 | 10/1997 |
| EP | 1 267 048 A1 | 12/2002 |
| EP | 1 495 807 A1 | 1/2005 |
| EP | 1 533 409 A1 | 5/2005 |
| EP | 1 696 110 A1 | 8/2006 |
| EP | 1 752 266 A1 | 2/2007 |
| EP | 1 830 043 A1 | 9/2007 |
| EP | 1 905 895 A1 | 4/2008 |
| EP | 1 931 862 B1 | 6/2008 |
| EP | 1 950 035 A1 | 7/2008 |
| GB | 1 438 762 A | 6/1976 |
| GB | 1 438 784 A | 6/1976 |
| GB | 2 116 476 A | 9/1983 |
| GB | 2 125 458 A | 3/1984 |
| GB | 2 200 129 A | 7/1988 |
| GB | 2 319 247 A | 5/1998 |
| JP | 6-272549 | 9/1994 |
| JP | 7-286514 | 10/1995 |
| JP | 2006/177368 A | 7/2006 |

(56) References Cited

FOREIGN PATENT DOCUMENTS

| WO | WO 97/32118 A1 | 9/1997 |
| WO | WO 99/23370 A1 | 5/1999 |
| WO | WO 00/75496 A1 | 12/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2005/106222 A1 | 11/2005 |
| WO | WO 2007/143437 A1 | 12/2007 |
| WO | WO 2008/103525 A2 | 8/2008 |
| WO | WO 2008/154078 A1 | 12/2008 |
| WO | WO 2008/156942 A1 | 12/2008 |

OTHER PUBLICATIONS

PCT/GB2010/052006—International Search Report, May 2, 2011.
PCT/GB2010/052006—Written Opinion of the International Searching Authority, May 2, 2011.
PCT/GB2010/052006—International Preliminary Report on Patentability, Jun. 14, 2012.
Gulati, Ten Eyck & Lebold. "Durable Packaging Design for Cordierite Ceramic Catalysts for Motorcycle Application" Society of Automotive Engineers Meeting, Detroit, MI, Mar. 1, 1993.
Maret, Gulati, Lambert & Zink. Systems Durability of a Ceramic Racetrack Converter. International Fuels and Lubricants Meeting, Toronto, Canada, Oct. 7-10, 1991.

\* cited by examiner

MOUNTING MAT

CROSS REFERENCE TO RELATED APPLICATIONS

This application is a national stage application of International Application No. PCT/GB2010/052006, filed 1 Dec. 2010, which claims priority from Great Britain Patent Application No. 0921055.0, filed 1 Dec. 2009 and Great Britain Patent Application No. 1005785.9, filed 7 Apr. 2010, from which applications priority is claimed, and which are incorporated herein by reference.

The present invention relates to mats, such as mats for mounting ceramic monoliths in vehicles.

It is known to catalyse oxidation or reduction of combustion products by passing the products into contact with a catalyst.

It is also known to remove unwanted entrained particulate matter by filtering a stream of fluid, e.g. a gas.

Vehicle exhausts are usually treated to reduce the amount of noxious gases which are emitted to the atmosphere. Vehicles typically use a catalytic convertor (CC) such as close coupled or under body petrol or diesel oxidation catalysts or selective catalytic reduction devices.

Vehicles which use diesel as a fuel may be fitted with a diesel particulate filter (DPF) to reduce the emission of particles of soot and other materials produced during combustion.

Both CCs and DPFs are typically fabricated as ceramic monoliths through which the combustive products pass before they are emitted from the exhaust. The ceramic monoliths are fragile and relatively expensive.

Accordingly, it is important to protect them from damage during use.

To ensure that the monoliths are securely held they are typically wrapped in mounting mats. These mats may be formed using intumescent or non-intumescent materials. Similar materials may be used for other automotive or other thermal insulation.

The monolith is located within a metal can mounted as part of a vehicle exhaust system. As combustion products pass through the monolith they heat it, causing the monolith to expand. Of course, the can will also heat and expand. Clearly, as the two materials will heat and expand at different rates, there is a potential for relative movement between the can and the monolith. In the conditions found in a vehicle exhaust system there is also significant vibration which could also cause the monolith to become damaged if not securely held. The mounting mats are intended to accommodate differential motion and vibration.

Non-intumescent materials may include fibres chosen from ceramic or glass fibres, such as silica, borosilicates, alumina (which may include high alumina and aluminosilicates in various Al:Si ratios, for example to provide mullite), zirconia and the like. The fibres are usually held in a binder matrix to aid canability, although additional and/or alternative consolidation techniques may be used, e.g. needling.

If present, the binder may be arranged to decompose and be burned off from the mat so as to allow the mat to adopt a configuration to exert pressure on the monolith and the walls of the can to securely hold the monolith in place during use. It will be appreciated that the holding force will need to be maintained throughout thermal cycling regimes. Another factor which is important is the friction coefficient between the can and the mat and the mat and the monolith. Clearly, if the coefficient of friction is too low, then the mat and/or the monolith may slip relative to the can which may impair performance and/or lead to damage of the monolith.

Accordingly, it is desirable to have a mat which is thermally stable and which can compensate for differential expansion rates of the can and monolith whilst maintaining a minimum holding pressure on the monolith, which can absorb or limit the effects of vibration and having suitable friction characteristics.

It is also important to consider that the mat should provide a significant resistance to fluid flow therethrough, while in situ between the monolith and the can. This is necessary to ensure that fluid flows preferentially (e.g. exclusively) through the monolith, thereby being exposed to the catalyst or the filter.

As the size of the monolith increases, the gap size between the monolith and can may increase. Thus, automobiles may have a gap size of e.g. 2 mm to 5 mm. Large monoliths, such as might be required for large vehicles such as lorries and ships and/or for heavy or agricultural machinery, can require gap sizes between the monoliths and the cans in which they are mounted of, for example, around 15 mm to 20 mm or larger. Typically, this means that larger mats having a higher basis weight, for example in the range of 3000 $gm^{-2}$ to 10000 $gm^{-2}$ are required for safe and successful mounting of the monolith.

The mat may also have a heat insulation function, which in some instances is of high importance. As the exhaust gases are typically at high temperature, and CCs typically require high temperatures to operate efficiently, cans may also reach extremely high and potentially unsafe temperatures without adequate insulation between the can and the monolith.

This is of particular importance when a can is positioned such that it may come into contact with e.g. users and/or flammable matter, for example, off-road vehicles such as agricultural machinery may include monoliths carried in cans which may come into contact with plant matter which could be ignited if heated excessively. It is desirable therefore, to keep the temperature of the can below the flash point of such plant material, even when the monolith carried therein maybe at a temperature in excess of 750° C. Indeed, certain agricultural machinery must be made such that no outside parts can reach over 200° C., the flash point of corn.

However, a typical problem with high basis weight mats is that the thickness of the mats also imparts a stiffness which makes wrapping the mat around a monolith without damage to, crinkling or cracking of, the mat difficult or impossible.

It is therefore a further object of the invention to provide a high basis weight mat having sufficient flexibility to allow for efficient and effective installation.

In a first aspect, the invention comprises a mat for mounting a monolith, the mat comprising a first inorganic fibre layer, where the mat has a front edge intended to form a gas facing edge in use, a rear edge opposite thereto and side edges extending between the front and rear edges, wherein the first inorganic fibre layer at a first side edge of the mat, and/or at a second side edge of the mat is cut at an acute angle to the thickness direction of the mat.

Such an angled cut has been found to prevent a groove, e.g. a V-shaped groove forming at the side of the monolith when the mat is wrapped around it in use, thereby ensuring that gas flows preferentially through the monolith, while also preventing e.g. increased erosion that may take place at the gas facing edge if a right angled cut mat were stretched at its outer surface to prevent the formation of such a groove.

The inventors have found that the angled cuts are particularly advantageous at high mat basis weights.

Preferably, the mat comprises a second inorganic fibre layer wherein at least a part of a major surface of the first layer is bonded to at least a part of a major surface of the second layer. Bonding may be effected by organic or inorganic adhesive, needling etc.

Preferably, the second layer at the first side edge of the mat, and/or the second layer at the second side edge of the mat is cut at an acute angle to the thickness direction of the mat.

Preferably, the sum of the cut angles of the first layer at the first and/or second side edges of the mat is between 0° and 90°, for example from 60° to 80°, e.g. 70° to the thickness direction of the mat.

Preferably, the sum of the cut angles of the second layer at the first and/or second side edges of the mat is between 0° and 90°, for example from 60° to 80°, e.g. 70° to the thickness direction of the mat.

Preferably, the first layer comprises alumina fibres or one or more materials selected from aluminosilicate (e.g. mullite), borosilicate, silica, glass (e.g. E-glass, S-glass or ECR glass), refractory ceramic fibres (RCF), body soluble fibres.

In a further aspect the invention provides a mat (e.g. a non-intumescent mat) for mounting a monolith, the mat comprising a first alumina fibre layer and a second inorganic fibre layer wherein at least a part of a major surface of the first layer is bonded to at least a part of a major surface of the second layer.

Preferably, the first layer comprises polycrystalline alumina fibres.

Preferably, the second layer comprises fibres of one or more materials selected from the second layer comprises alumina fibres or one or more materials selected from alumina, silica, glass (e.g. E-glass, S-glass or ECR glass), refractory ceramic fibres (RCF).

The first layer preferably provides greater heat insulation per unit volume than the second layer. For example, in the case where the first layer comprises alumina fibres, the second layer does not comprise alumina fibres, thereby allowing for a thinner first layer than second layer. The relatively thicker second layer may thus make up a greater proportion of the weight of the mat than the first layer. As, say, silica, glass or RCF fibres may typically be cheaper than, say, alumina fibres, the laminate mat thus combines the superior insulation properties of, say, alumina fibres with the relatively low cost of other inorganic fibres.

Preferably, the first layer is intended to provide a monolith facing layer of the mat. The use of an alumina fibre layer adjacent the monolith provides excellent heat insulation properties, which is particularly desired where a silica fibre second layer is provided, as the alumina fibre layer protects the silica fibre layer from excessive heat.

Preferably the first layer and/or the second layer comprise nonwoven fibres.

Preferably the first layer and/or the second layer comprise fibres having an average diameter between 3 μm and 15 μm, say between 4 μm and 10 μm, e.g. between 5 μm and 7 μm.

In some embodiments the average diameter of the fibres in the second layer is greater than the average diameter of the fibres in the first layer.

In further embodiments, the mat may comprise further, e.g. third and optional fourth, layers of inorganic fibres. Preferably, the average diameter of the fibres in the further layers may be the same or greater than the average diameter of the fibres in one or both of the first and second layers.

Preferably the mat has a basis weight of 500 to 15000 $gm^{-2}$, e.g. 1000 to 6000 $gm^{-2}$, for instance between 3500 $gm^{-2}$ and 5500 $gm^{-2}$, say 5000 $gm^{-2}$.

Preferably, the mat has a basis weight of 3000 to 10000 $gm^{-2}$, e.g. 4000 to 8000 $gm^{-2}$, for instance between 5000 $gm^{-2}$ and 6000 $gm^{-2}$, say 5500 $gm^{-2}$.

The first and second layers may have the same or different basis weights. Preferably, the first layer has a basis weight of around 100 to 5000 $gm^{-2}$ and the second layer have a basis weight of around 100 to 7000 $gm^{-2}$, for example the first layer may have a basis weight of around 1000 to 3000 $gm^{-2}$ and the second layer may have a basis weight of around 2000 to 7000 $gm^{-2}$, where the basis weight of the first layer may be the same as or different to the basis weight of the second layer.

Preferably, the first and second layers are secured together by securing means. More preferably, the securing means extend from the front edge of the mat to the rear edge of the mat.

Advantageously, the provision of securing means which extends from the front edge to the rear edge of the mat ensures that the mat undergoes a minimal level of wrinkling or buckling in the region of the securing means when it is wrapped around a monolith and stuffed into a can.

Preferably, the securing means comprises an adhesive.

In some embodiments, the adhesive may comprise an inorganic sol, e.g. a silica or alumina sol.

In some embodiments the adhesive comprises an adhesive web, e.g. a polyester based thermoplastic web with a melting point in the range of 110-130° C.

In some embodiments the adhesive comprises polyvinyl acetate (PVA).

In some embodiments the adhesive comprises starch. Alternatively or additionally, the adhesive comprises a polymerisable material e.g. heat polymerisable materials such as acrylates and crosslinkable acrylates and saccharides. By polymerisable material we mean a material which may form chemical bonds or links with itself or a different species.

In some embodiments, the adhesive may comprise a pressure sensitive adhesive.

Preferably, the adhesive is arranged in a plurality of regions between the major surfaces of the first and second layers.

The adhesive preferably has a shear strength over an area of 25 $cm^2$ of at least 4N, preferably at least 8N, e.g. between 8 N and 30 N so as to provide the necessary force to secure the two in use.

Additionally or alternatively, the first and second layers are bonded by needling.

Preferably the interface between the major surfaces of the layers is smaller than one or both of the major surfaces, e.g. the first layer and the second layer are offset with respect to one another.

Preferably at least one of the major surface areas of the second layer is at least equal to, or preferably greater than the major surface areas of the first layer.

Preferably the width of the second layer is greater than the width of the first layer.

Preferably, the two layers are, at rest, discontinuously in contact with one another, e.g. such that the second layer is attached to the first layer such that the mat forms a bow shape. In some such embodiments, the first layer is divided into a plurality of, e.g. two, pieces. The provision of the first layer in two pieces allows the mat to be stored in a flat condition and then assembled into a bow shape prior to installation.

Preferably the pieces of the first layer comprise a recessed portion for receiving a corresponding projected portion of an adjacent piece or a projecting portion for being received in a corresponding recessed portion of an adjacent piece.

Alternatively, the first layer is attached to the second layer at one side edge, the other side edge being unattached. Preferably, the mat comprises attachment means for attaching the first layer to the second layer at the other side edge, e.g. to create a bow shaped mat, prior to installation. Preferably the attachment means comprises a portion of adhesive tape or a region of adhesive on the first and/or second layer, say, covered with a removable tab or release liner.

Preferably a first side edge of the mat comprises a recessed portion for receiving a corresponding projected portion at a second side edge of the mat when the mat encircles a monolith in use.

Preferably the first and/or second layer at the or a first side edge of the mat, and/or the first and/or second layer at the or a second side edge of the mat is cut at an acute angle to the thickness direction of the mat, for example to give the mat and/or each layer a trapezoidal cross section. Preferably, the sum of the cut angles of the first layer at the first and/or second side edges of the mat is between 0° and 90°, for example from 60° to 80°, e.g. 70° to the thickness direction of the mat. Preferably, the sum of the cut angles of the second layer at the first and/or second side edges of the mat is 60° to 80°, e.g. 70° to the thickness direction of the mat.

Preferably, intended front and/or rear edges of the mat (e.g. intended front and/or rear edges of the first and/or second layers of the mat) are shaped, e.g. slant cut such that at least a portion of the front edge of the mat effectively protrudes from the mat and/or at least a portion of the rear edge of the mat effectively recedes from the mat.

Preferably, the intended front and/or rear edges of the mat (e.g. intended front and/or rear edges of the first and/or second layers of the mat) are slant cut to provide a substantially trapezoidal, e.g. rhomboid cross section.

The mat may be shaped by milling, routing, cutting, slicing, sawing etc.

Additionally or alternatively, the mat may be stepped in that one of the first or second layers, e.g. the intended outer layer, is longer than the other to provide a protruding portion of that first or second layer at the intended front edge of the mat and/or the first and second layers are offset with respect to one another in the intended axial direction.

Preferably, the first layer comprises less than around 15 w/w %, say 10 w/w % organic components. For example, the second layer may comprise less than around 8 w/w %, 7 w/w %, 6 w/w %, 5 w/w %, 4 w/w % or 3 w/w %, e.g. less than around 2.5 w/w % organic components.

Preferably, the second layer comprises less than around 15 w/w %, say 10 w/w % organic components. For example, the second layer may comprise less than around 8 w/w %, 7 w/w %, 6 w/w %, 5 w/w %, 4 w/w % or 3 w/w %, e.g. less than around 2.5 w/w % organic components. In some embodiments, for example where the second layer is needled, the second layer comprises less than 1 w/w %, e.g. less than 0.1 w/w % organic content, or indeed is free from organic content.

Preferably, the ratio of the thickness of the first layer to the second layer is 1-10:10-1. More preferably, the ratio of the thickness of the first layer to the second layer is 1-5:1-10, e.g. 1:1-10 or 1:2-5. Such ratios provide an advantageous balance between wrapability, insulation, holding pressure and cost.

Preferably, the first or the second layer comprises a plurality of sections. Preferably the sections are interlocked and/or individually attached to the other of the first or second layer.

In some embodiments the securing means comprises a scrim e.g. a ligno-cellulosic scrim or a nonwoven polypropylene scrim at least partially wrapped around the mat.

In another aspect the invention provides a mat for mounting a monolith, the mat comprising a first fibre layer having a relatively high heat conductance per unit volume and a second fibre layer having a relatively low heat conductance per unit volume, wherein at least a part of a major surface of the first layer is bonded to at least a part of a major surface of the second layer and where the first layer is intended to provide a monolith facing layer.

In another aspect, the invention provides a mat, e.g. a high basis weight mat, for mounting a monolith, wherein a first side edge of the mat and/or a second side edge of the mat opposite the first side edge is cut at an acute angle to the thickness direction of the mat, for example to give the mat and/or each layer a trapezoidal cross section.

Preferably, the sum of the cut angles at the first and/or second side edges of the mat is 60° to 80°, e.g. 70° to the thickness direction of the mat.

In a further aspect, the invention provides a method for manufacturing a mat for mounting a monolith, the method comprising providing a first layer of nonwoven fibres, applying an adhesive to at least part of a first major face of the first layer, and securing at least part of a major face of a second layer of nonwoven fibres to the adhesive, wherein the first layer comprises alumina fibres and the second layer comprises silica fibres or alumina fibres.

Preferably the adhesive comprises an organic binder, e.g. a PVA solution, more preferably an aqueous PVA solution. More preferably, the adhesive comprises a 0.01 w/w % to 99.99 w/w % aqueous PVA solution, e.g. a 0.05 w/w % to 50 w/w % PVA solution. More preferably, the adhesive comprises a 1 w/w % to 30 w/w % aqueous PVA solution. In some embodiments, the PVA solution is made by dissolving PVA in water.

Alternatively, the adhesive may comprise starch, e.g. in the form of a wallpaper paste.

Additionally or alternatively, the adhesive may comprise other polymerisable materials, e.g. heat polymerisable materials such as acrylates and crosslinkable acrylates and saccharides.

Additionally or alternatively, the adhesive may comprise a pressure sensitive adhesive.

Preferably, the adhesive is applied to the major surface of the first layer in at least one dot matrix arrangement, e.g. a 4 to 50 dot matrix, for example a 16 dot matrix. Preferably 0.01 ml to 5 ml adhesive is applied to each dot. More preferably, 0.02 ml to 2 ml, e.g. 0.04 ml is applied to each dot of the matrix.

Alternatively, the adhesive is applied substantially uniformly over a portion (e.g. two, three, four or more portions) of the major surface of the first layer.

The adhesive may be applied to the major surface of the first layer by, e.g. printing, dipping, spraying, painting or otherwise.

Preferably, the adhesive has a viscosity between 1 cP and 10000 cP as measured on a Brookfield viscometer at 25° C. The viscosity of the adhesive prevents wicking of the adhesive from the major surface of the layer, thereby providing a more effective join between the first and second layers.

In alternative embodiments, the adhesive comprises a thermoplastic webbing.

Preferably, the adhesive is applied to a plurality of regions of the first major surface of the first layer, e.g. a plurality of regions being spaced from each other. Preferably, the adhesive is applied to a region adjacent a first side edge of the layer, a region adjacent a second side edge of the layer and a region at the central portion of the layer.

In some embodiments, for example where the adhesive comprises an adhesive webbing, the mat may be cured at elevated temperature, e.g. at 80° C. to 180° C., e.g. between 110° C. and 140° C. Preferably, the curing is under pressure, e.g. in a hot press, holding the mat at less than or equal to 0.8 GBD, e.g. less than 0.5, 0.4, 0.3 or 0.2 GBD. Preferably, the mat is cured for around 1 minute to 30 minutes. More preferably, the mat is cured for around 2 minutes to 10 minutes, e.g. 4 minutes to 8 minutes.

In some embodiments, the mat is cured while held in a desired shape, e.g. as if wrapped around a monolith, to produce a finished, preferably flexible, mat substantially of that shape.

In a further aspect, the invention provides a high basis weight mat comprising at least two, e.g. 3 to 10, segment portions, whereby the segment portions are moulded to form a tubular (e.g. cylindrical or oblong) cylindrical mat when arranged around the circumference of a monolith.

Preferably, the mat comprises 3, 4, 5 or 6 segment portions. Portions may be shaped as to provide an interference fit, e.g. a preceding portion is shaped to mate with a succeeding portion.

Preferably, the mat is moulded by the use of a binder composition comprising 2 w/w % to 60 w/w %, e.g. 25 w/w % to 60 w/w %, for example 25 w/w % to 53 w/w % inorganic binder, for example a sol such as silica or alumina sol.

The inclusion of an inorganic sol, for example at a concentration of over 4 w/w %, as a binder in the mat provides the mat with an excellent shape retention quality, even after extended periods of storage.

Preferably, the mat comprises an organic binder, e.g. a latex binder, having a Tg above −20° C., for example between −20° C. and 60° C., e.g. between −10° and 25° C.

Preferably the segments each comprises a projected portion at a first side edge and a recessed portion at an opposite side edge, the recessed portion for receiving a corresponding projected portion of an adjacent segment as the mat encircles a monolith in use.

Preferably, the mat comprises up to 40%, e.g. 20% silica fibres based on the total weight of fibres. Preferably the silica fibres comprise at least 70 w/w % silica, for example 80 w/w % to 99.9 w/w % silica, e.g. 96% silica.

It is also envisaged that such moulded mats may be produced as a single, e.g. cylindrical part for sliding over a monolith when mounting.

In a further aspect of the invention, there is provided a mat for mounting a monolith, where intended front and/or rear edges of the mat (e.g. intended front and/or rear edges of the first and/or second layers of the mat) are shaped, e.g. slant cut such that at least a portion of the front edge of the mat effectively protrudes from the mat and/or at least a portion of the rear edge of the mat effectively recedes from the mat.

In this specification, references to alumina fibres include alumina/silica-based crystalline short fibre having a silica content of not more than 5% by weight, namely an alumina content of not less than 95% by weight, and other ordinarily used alumina fibres containing 70 to 95% by weight of alumina and the remainder consisting of silica, such as mullite fibres containing 72% by weight of alumina.

Embodiments of the invention will now be described in more detail with reference to the accompanying drawings.

FIG. 1 shows differing views of a mat according to the present invention.

Figure 2:
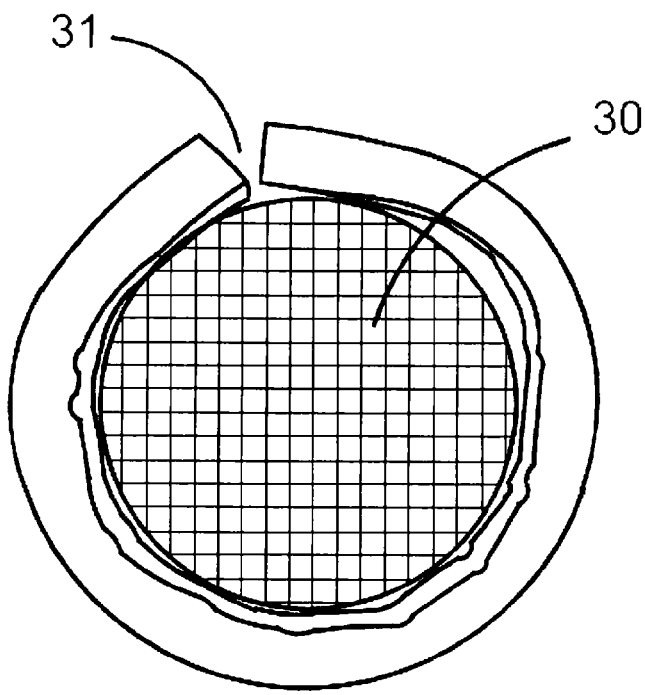
Figure 3:
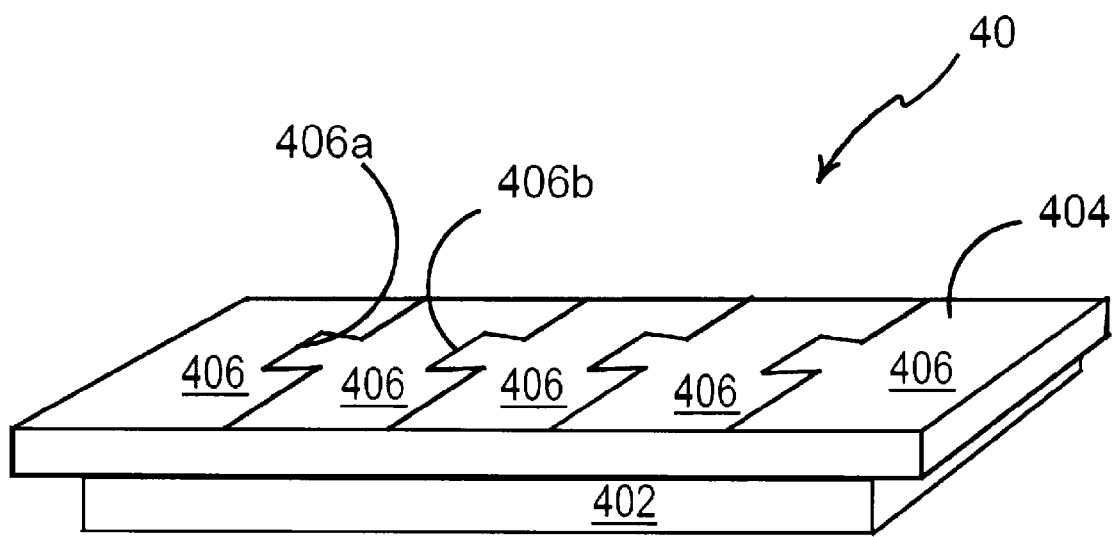
Figure 4:
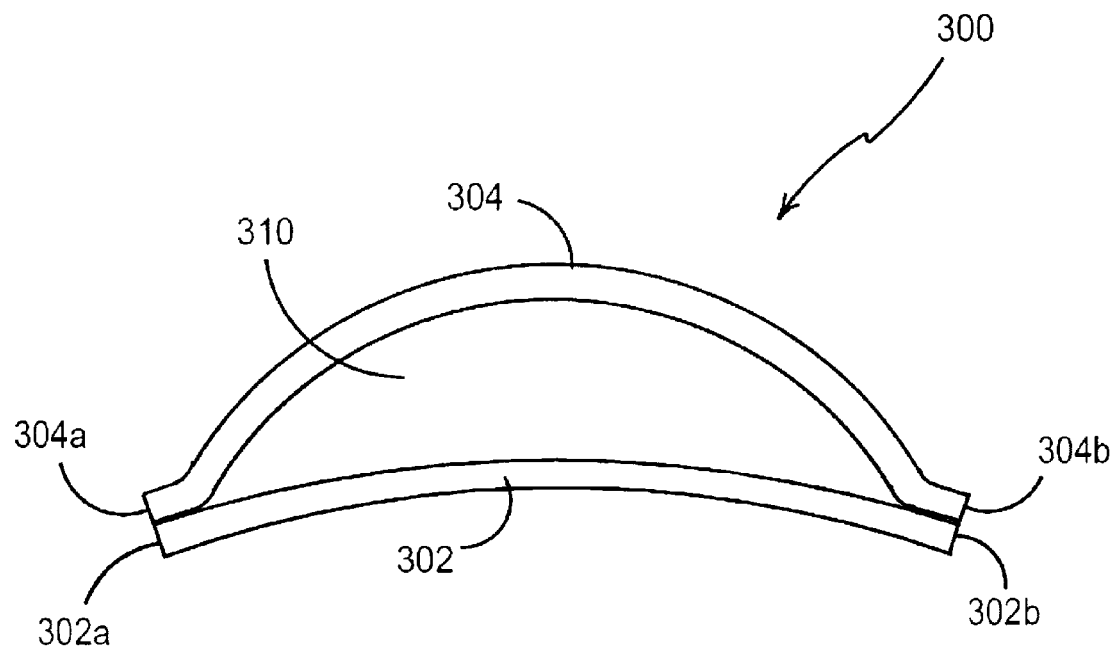
Figure 5:
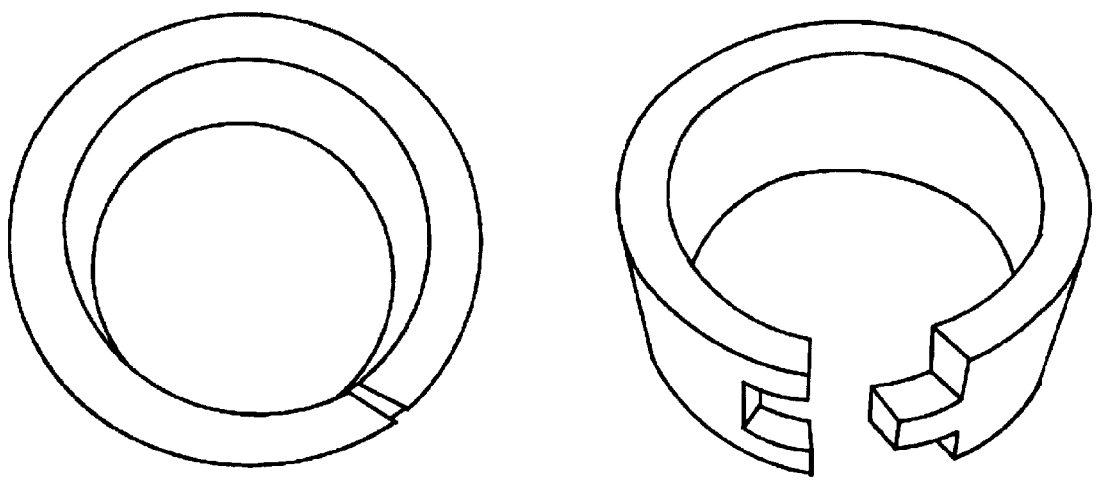
Figure 6:
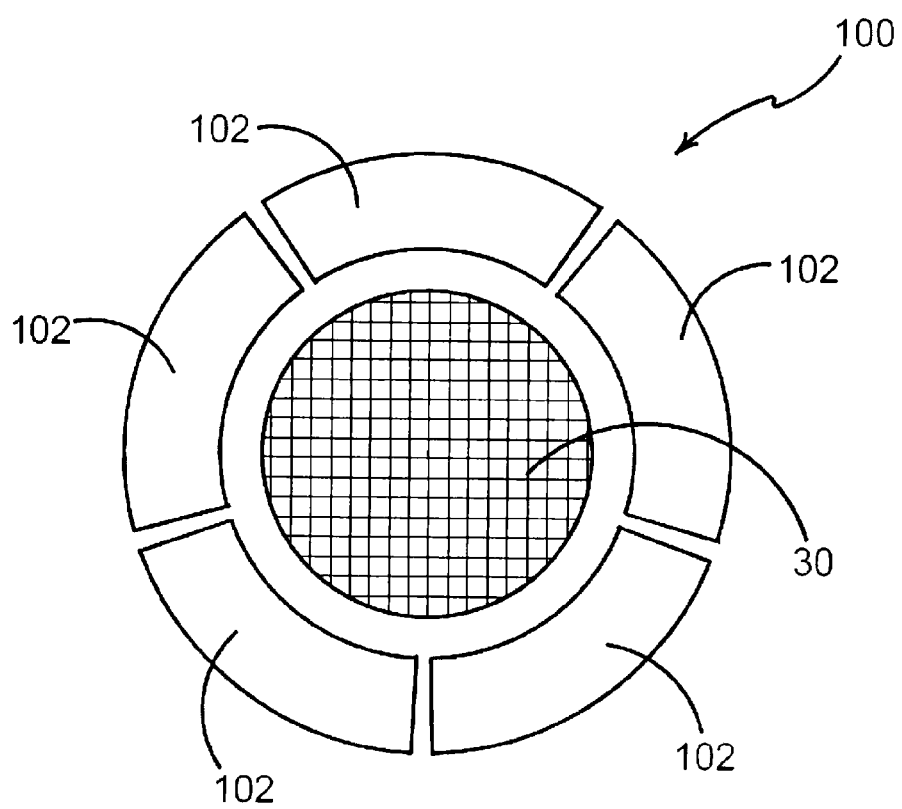
Figure 7:
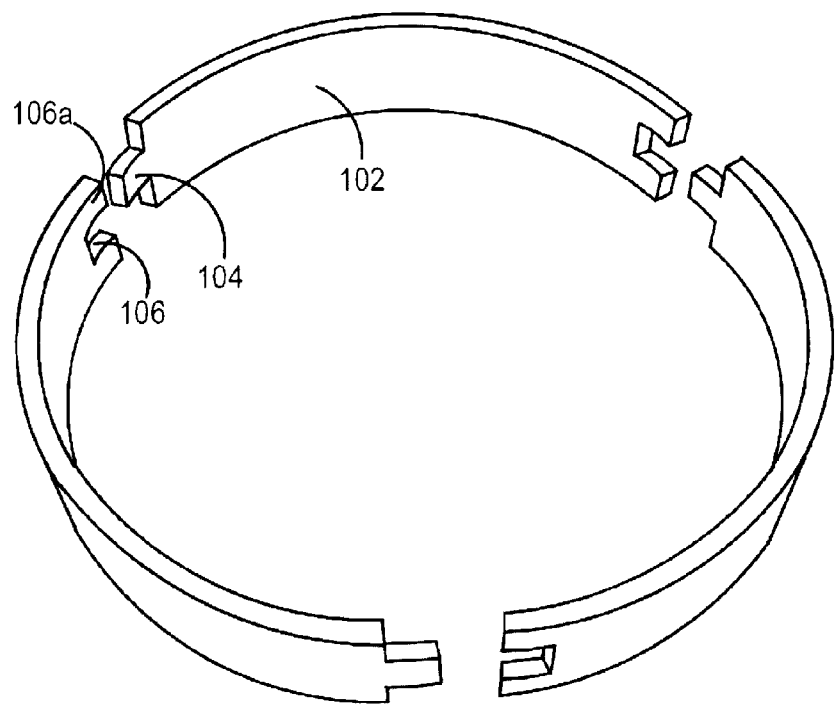
Figure 8:
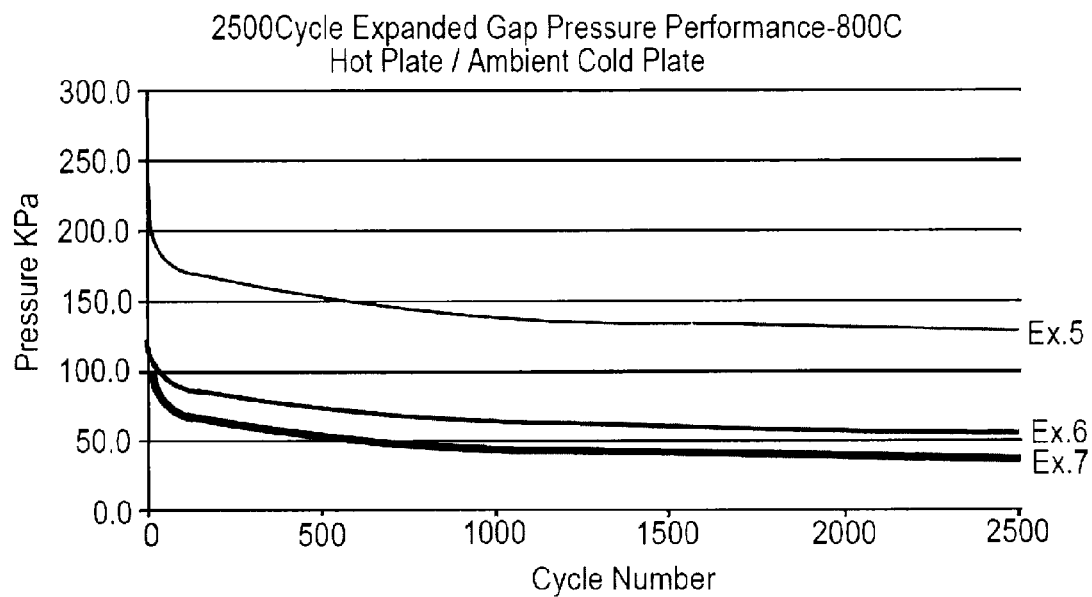
Figure 9:
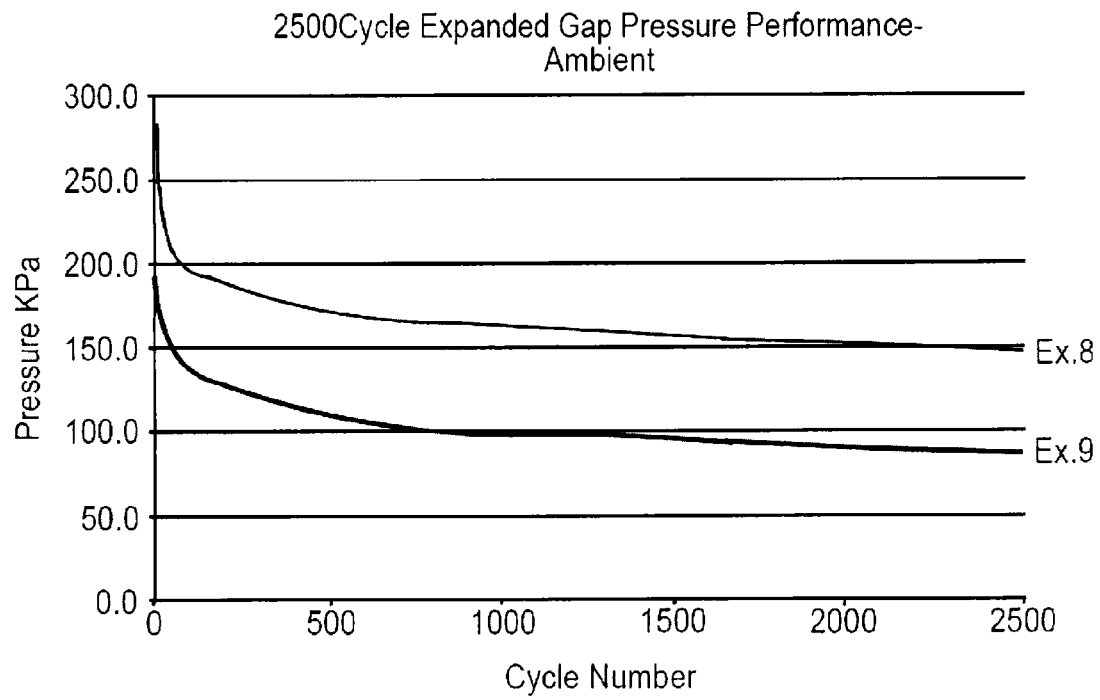
Figure 10:
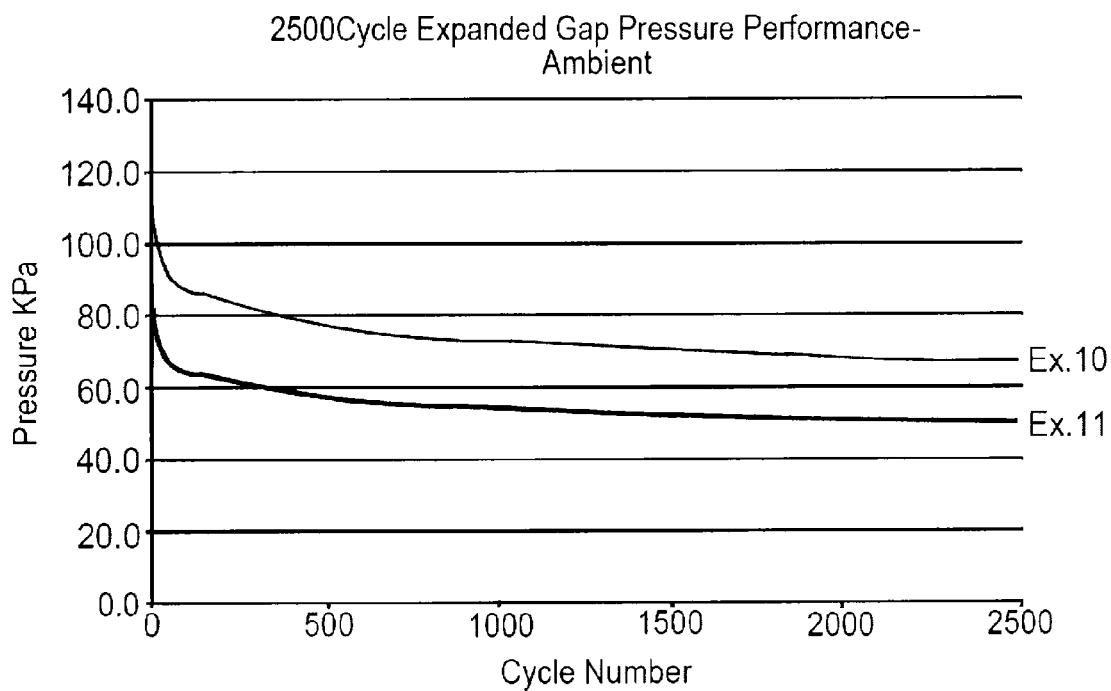

FIG. 2 shows a prior art mat wrapped around a monolith.
FIG. 3 shows a mat according to the present invention.
FIG. 4 shows a mat according to the present invention.
FIG. 5 shows a mat according to the present invention.
FIG. 6 shows a mat according to the present invention.
FIG. 7 shows a mat according to the present invention
FIG. 8 shows a plot of Pressure Performance data for embodiments of the present invention.
FIG. 9 shows a plot of Pressure Performance data for embodiments of the present invention.
FIG. 10 shows a plot of Pressure Performance data for embodiments of the present invention.

An inner mat 10 is shown in FIG. 1. The mat 10 has a front edge 10A, a back edge 10B and side edges 10C, 10D and comprises a inner layer 12 secured to a outer layer 14 by means of an adhesive 16. The mat 10 is intended to be wrapped around a monolith 30, in use, such that the front edge 10A aligns with the leading edge of the monolith 30.

The inner layer 12, intended to be positioned adjacent the can in use, comprises a needled nonwoven silica fibre mat. The outer layer 14, intended to be positioned adjacent the monolith in use, is comprised of non-woven alumina fibres and includes an organic, e.g. latex, binder which helps to maintain its structural integrity during handling. The total organic content of the mat 10, including the binder, is around 2.2 w/w %.

The thickness $T_S$ of the inner layer 12 is around three times that of the thickness $T_A$ of the outer layer 14.

The adhesive 16 comprises a PVA adhesive, such as may be applied by means of an aqueous solution.

The adhesive 16 is arranged in a regular or random array or arrays of spots at the interface 24 between the inner layer 12 and the outer layer 14. A first array 16a is positioned toward a first side edge 10C of the mat, a second array 16b is positioned in a portion 22 approximately half way along the mat and a third array 16c is positioned toward the second side edge 10D of the mat.

Ensuring that an effective and secure fit around the monolith 30, the inner and outer layers 12, 14 are offset with respect to one another. The inner layer 12 is secured atop the outer layer 14 such that the inner layer 12 directly overlays and aligns with the outer layer 14 along the front edge 10A and back edge 10B of the mat, but is staggered in the width direction, the width direction intended to be circumferential to the monolith 30 in use.

At the first side edge 10C of the mat 10, a notch 26 is cut into the mat 10 for receiving a corresponding tongue 28 positioned at the second side edge 10D of the mat 10 when the mat is wrapped around a monolith 39, thereby helping to secure the mat 10 in place before canning.

The end 32 of the tongue 28, the inner edge 34 of the notch 26 and the first side 10C and the second side 10D of the inner and outer layers 12, 14 are cut on a slant such that the width of the inner 12 and outer 14 layers is greater in the outer, can-facing surfaces than in their inner, monolith facing surfaces, each of the inner 12 and outer 14 layers thereby having a trapezoidal cross section. These slant cuts allow the mat 10 to be effectively wrapped around the monolith 30 and secured in place without leaving a typical V-shaped aperture 31 along the principal axis of the monolith 30 typical of straight-ended mats (see FIG. 2). Typically, the sum of the slant angles $\alpha_1$ and $\alpha_2$ at each side edge of the outer layer is around 70° and the sum of the slant angles $\theta_1$ and $\theta_2$ at each side edge of the inner layer is around 35°. Of course, it is possible that only one of the sides of the mat is cut on the slant, provided that the angle of that slant is around 70°.

In another feature to ensure effective wrapping of the mat 10 around a monolith 30, the average width of the inner layer 12 is greater than that of the outer layer 14, the monolith facing surface 38 of the inner layer being substantially equal in width to the can facing surface 40 of the outer layer 14. The difference in width of the two layers 12, 14, particularly when combined with the slant cuts at the side edges of the mat 10 ensure that the mat completely encircles the monolith 30 in use, providing an effective holding pressure and preventing flow of gas other than through the monolith 30 itself.

Figure 1B:
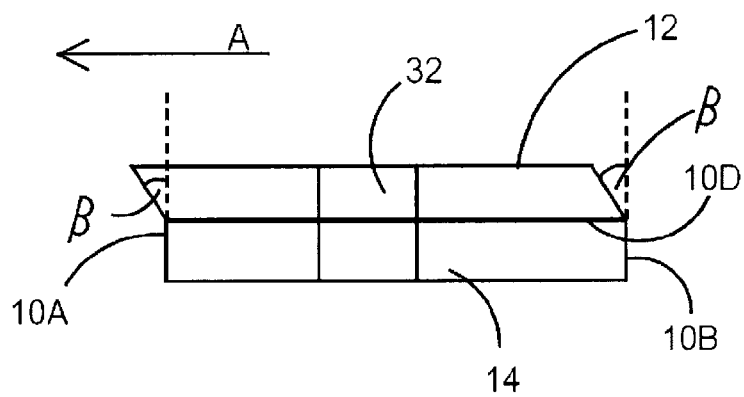

FIG. 1B shows a view of the second side edge 10B of the mat 10. The front edge 10A and the back edge 10B of the inner layer 12 are also cut on a slant, such that the inner layer has a substantially rhomboid cross section, the slant cut edges 10A, 10B of the inner layer 12 each forming an angle β with the thickness direction of the mat.

This arrangement ensures that when the mat 10 is canned in a direction A (relative to a static can) with a monolith by hard stuffing into a can of similar (or even smaller) diameter, with the front edge 10A of the mat 10 acting as the leading edge, the inner layer 12 is stretched into alignment and a substantially rectangular shape by friction forces on the internal walls of the can. In turn, this ensures a substantially uniform density of the mat 10 around the monolith in use.

Of course, this feature could be applied to any mat, whether a laminate or single layered mat. Moreover, laminate mats may have one some or all of their layers slant cut in this manner.

While in this embodiment, the slant cuts are provided such that the mat has a substantially rhomboid cross section, the cuts may be of differing shapes (e.g. stepped, parabolic or otherwise curved), provided that the front edge 10A of the mat 10 effectively protrudes from the mat at its intended outer face and the rear edge 10B of the mat effectively recedes (e.g. by substantially the same amount) at its intended outer face.

This feature may be additionally or alternatively provided by using a longer (in the intended axial direction, i.e. between their respective front 10A and rear 10B edges) inner layer 12 than outer layer 14, to offer a protruding portion of the inner layer 12 at the front edge 10A and/or offsetting the layers 12, 14 to provide a protruding portion of the inner layer 12 at the front edge 10A and a protruding portion of the outer layer 14 at the rear edge 10B.

The mat 10 is preferably made by application of the adhesive 16 to the surface of the inner layer 12 or outer layer 14, placing the outer layer 14 or the inner layer 12 thereupon, as appropriate, aligned as described above. The combined inner and outer layers 12, 14 are then placed in a hot press and held at 0.2 GBD at 180° C. (such that the interface 24 temperature is not allowed to exceed 140° C.) for 1 to 20 minutes.

By curing the adhesive when the mat is held in a particular arrangement, e.g. rolled cylindrically as if wrapped around a monolith, the mat may substantially hold this shape after curing, as is shown in FIG. 6.

The adhesive may be a 0.01 w/w % to 50 w/w % aqueous PVA solution, having a viscosity between 1 cP and 10000 cP (as measured on a Brookfield DV-II rheometer set at 30 rpm), which may be a ready made solution or made by dissolving thermoplastic PVA fibres in hot water. The solution is applied on the surface of the inner layer 12 or the outer layer 14 in a first array 16a is positioned toward a first side 18 of the mat, a second array 16b is positioned in a portion 22 approximately half way along the mat and a third array 16c is positioned toward the second side 20 of the mat.

More concentrated PVA solutions (e.g. 10 w/w % to 50 w/w %) are preferred when the inner layer 12 comprises silica fibres. However, in alternative embodiments, such as where the outer layer comprises alumina or alumina silica fibres, lower concentration PVA solutions (e.g. 0.01 w/w % to 10 w/w %) may be preferred.

As would be understood by one skilled in the art, many other adhesives may provide appropriate means for securing the inner layer 12 to the outer layer 14. Such adhesives may include starch (e.g. starch wallpaper paste), thermoplastic web such as Bostik™ 30 GSM (available from Bostik Limited) and pressure sensitive adhesives.

Such a thermoplastic web may, for example, be continuously fed between lines of inner 12 and outer 14 layers e.g. by sets of optionally heated nip rollers. The inner 12 and outer 14 layers may then be pressed into a laminate e.g. by further sets of optionally heated nip rollers.

When fitting the mat 10 around a monolith 30, the monolith 30 is placed on the outer layer 14 and the mat 10 is wound around the monolith 30, being secured by fitting the tongue 28 into the notch 26. Optionally, a quantity of adhesive tape or further liquid adhesive may be used to further secure together the first side 18 of the mat 10 and the second side 20 of the mat 10.

The monolith 30 wrapped in the mat 10 may then be canned by known stuffing methods, loaded into a clamshell can, or by any other method as known by those skilled in the art.

Further resistance to telescoping during stuffing may be provided by, for example, wrapping the mat 10, 200 itself with a scrim, e.g. a ligno-cellulosic or polypropylene scrim which burns away in use.

A further embodiment is shown in FIG. 3. A mat 400 comprises an inner layer 402 comprising alumina fibres and an outer layer 404 formed from silica fibres and comprising a plurality of discrete sections 406, the side edges 406a, 406b of which are shaped to interlock with each other.

Each section 406 of the outer layer 404 is adhered to the inner layer 402. As described above, the outer silica fibre layer 404 is longer than the inner alumina fibre layer 402, enabling an effective fit when wrapped around a monolith. Moreover, tongue and notch sections and slanted cut edges may be provided, as described above.

The provision of the outer layer 404 in a plurality of sections 406 allows for improved flexibility of the mat 400 while each section 406 is individually adhered to the inner layer 402, thereby also reducing the likelihood of telescoping.

As would be understood by those skilled in the art, the same effect could be achieved by providing a single piece alumina or silica fibre layer for a can-facing surface of a mat and a multi-section alumina fibre layer for a monolith-facing surface of that mat.

Another embodiment is shown in FIG. 4. A mat 300 is comprised of an inner alumina fibre layer 302 and an outer silica fibre layer 304. The outer layer 304 is longer than the inner layer by a length of approximately 2π times the total thickness of the mat.

The interfacing surfaces 306, 308 of the inner layer 302 and the outer layer 304 are adhered to each other in the region of side edges 302a, 302b, 304a, 304b of the layers such that those side edges 302a, 302b, 304a, 304b directly overlay each other. This adhesion arrangement causes the mat 300 to bow, providing for easier wrapping around a monolith.

As the mat 300 is wrapped around a monolith, the gap 310 between the inner layer 302 and the outer layer 304 narrows, providing a snug fit around the monolith.

The arcing of the mat in its unwrapped form imparts good flexibility, at least in part because the two layers 302, 304 are unable to support (and thus stiffen) each other as they would do when in direct interfacial contact.

In order to allow this mat 300 to be efficiently stored, it may be provided to the user when the inner 302 and outer 304 layers are secured together at only one of the side edges 302a, 302b, 304a, 304b, and securing means such as a portion of adhesive tape may be used to secure together the other of the side edges 302a, 302b, 304a, 304b of the mat 300.

Alternatively, the inner layer 302 may be provided in two parts 306a, 306b, securable together by engaging a projecting portion 308a of the first part 306a with a corresponding recessed portion 308b on the second part 306b.

Figure 4A:
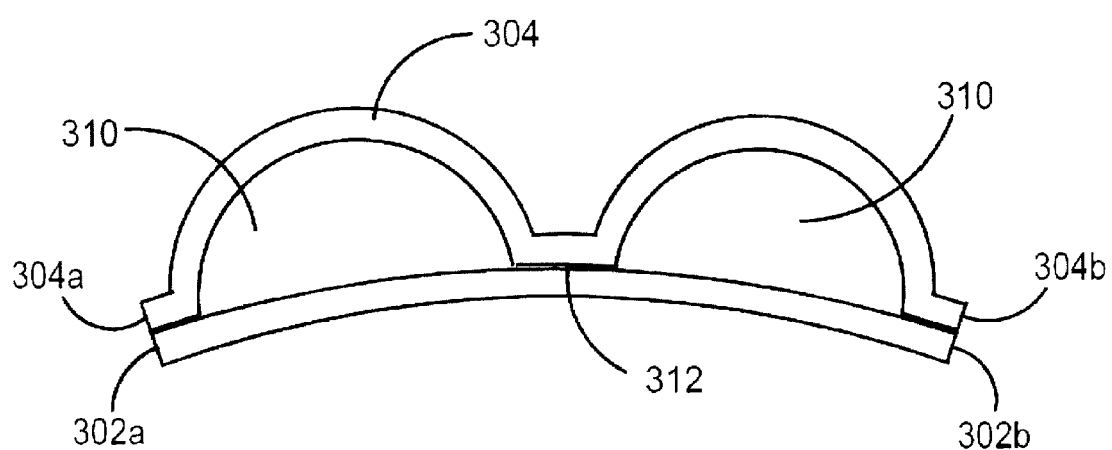
Figure 4B:
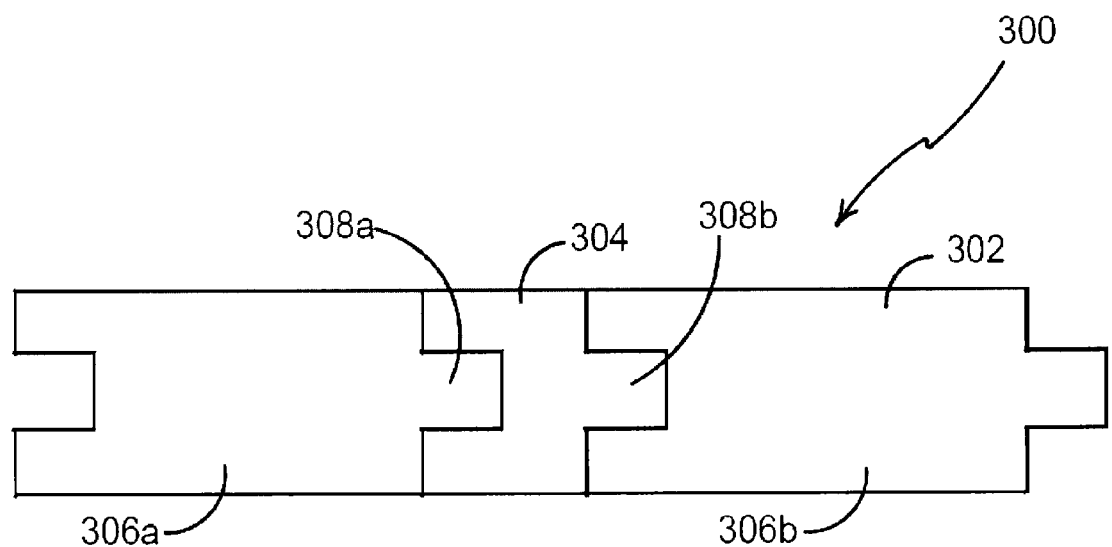
Figure 4C:
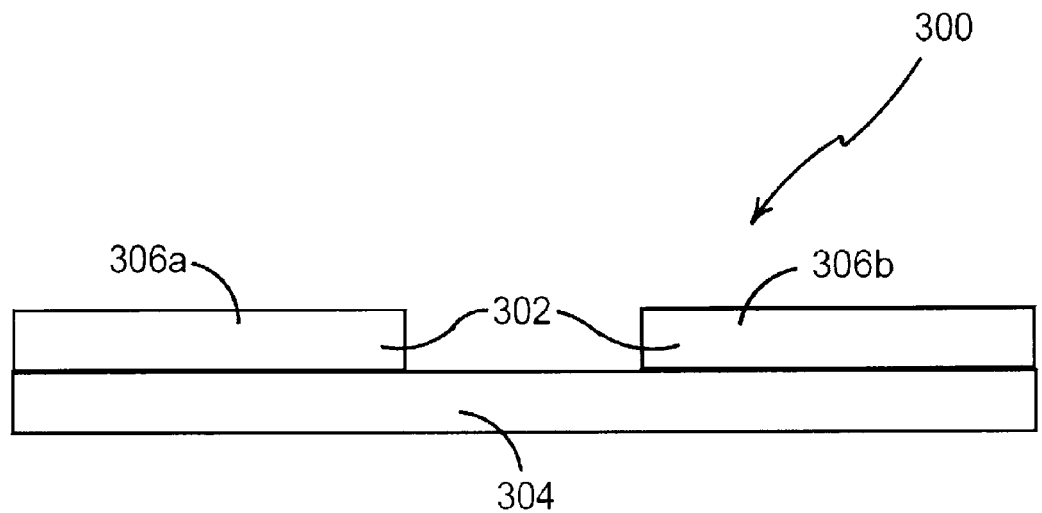

In a variation of this embodiment shown in FIG. 4a, the inner 302 and outer 304 layers are also adhered to each other in a central region 312 of the mat 300. This causes a double bowing of the mat and provides both the desired flexibility and reduces telescoping when the mat is canned by stuffing.

In a further embodiment, a laminate mat is provided by adhering together successive layers alumina fibre mats of the same, different or progressively lighter basis weight. For example, a first mat may comprise a layer of 2600 gm$^{-2}$ alumina fibre material and a second layer of the same material. Alternatively, a second mat may comprise a layer of 3000 gm$^{-2}$ alumina fibre material and a second layer of 2200 gm$^{-2}$ alumina fibre material. Still alternatively, a mat may comprise an inner layer of 2700 gm$^{-2}$ alumina fibre material, an outer layer of 1250 gm$^{-2}$ alumina fibre material and a third layer of 1250 gm$^{-2}$ alumina fibre material.

The relative ease with which the alumina fibre layers can be adhered together means that a strong bond can be provided between the layers and that the mat is thus resistant to telescoping during canning.

In another embodiment, as is shown in FIGS. 6 and 7, there is provided a high basis weight (e.g. around 4500 gm$^{-2}$ to 5000 gm$^{-2}$) mat 100, comprising, for example, three or five mat segments 102. The mat segments 102 comprise nonwoven alumina fibres moulded and shaped into rigid or semi-rigid forms having arced cross section.

The segments are shaped to each include interengagable tongues 104 and notches (106) at their side edges 108a, 108b. Moreover, the side edges are each shaped to define an angle of 35° with the thickness direction of the complete mat (i.e. the radial direction).

When the segments 102 are brought together, a cylindrical mat 100 is formed.

The segments 102 are formed by slurrying alumina fibres with pulp and an organic binder (e.g. latex) and up to 60 w/w % alumina sol. The organic binder optionally has a high Tg, e.g. between −20° C. and 60° C. The slurry is added to a mould dimensioned to provide a cylindrical segment having an internal diameter substantially equal to the diameter of the monolith 30 and a circumference portion of one fifth of the circumference of the monolith 30. Excess liquid is removed under compression and vacuum, the segment 102 being allowed to dry by optional heating under compression. The finished segments can be stacked for ease and efficiency of storage and transport.

In loading the monolith 30 into a can, the segments 102 may be arranged around the outside of the monolith 30, thereby encircling the monolith 30 to provide a complete cylindrical mat 100, the tongues 104 each engaging the notches 106 of the adjacent segment 102. The segments 102 may, if necessary, be secured in place by a quantity of adhesive tape, or by tying with metallic, plastic or textile ties, e.g. straps. The monolith 30 and mat 100 may then be loaded into the can by e.g. stuffing or by a clamshell arrangement, as is understood by those skilled in the art. As the mat does not comprise a laminate material, it is less susceptible to problems of stuffing such as mat telescoping.

Tests

Thermal Conductivity Test

In order to test the insulation properties of the mats, a directly controlled platen was provided at 800° C. The outer layer 14 of the mat was placed against the hot platen and an unheated cool platen was placed against the inner layer 12 of the mat. The mat was compressed to a fibre gap bulk density (FGBD) of 0.4. The temperature was measured at the interface of the inner layer 12 and the outer layer 14 of the mat 10, and at the interface of the inner layer 12 and the unheated platen.

Laminar Shear Test

In order to test the laminar shear strength, mats were loaded into apparatus comprising a fixed support, a movable support and a means for measuring the tensile force applied by the movable support. The inner layer 12 was attached at the second side 20 of the mat 10 to the stationary support and the outer layer 14 was attached at the first side 18 of the mat 10 to the movable support. The movable support was actuated to provide an increasing and measurable force pulling away from the stationary support. The force at which the laminar structure of the mat 10 failed, be it by failure of the adhesive or one or both of the layers or otherwise, was noted.

Pressure Performance (PP) Test

Mats are fired up to 800° C. to remove any remaining organic species and the organic binder. The mats are then cycled 2500 times in a spacer between a compression of FGBD 0.3 or 0.4 gcm$^{-3}$ and a 4%, 6%, 8% or 10% relative gap expansion (RGE). The holding pressure was then measured at 4%, 6%, 8% or 10% RGE at the 2500$^{th}$ cycle.

In an ambient temperature version of the PP test, the spacer comprises a pair of plates held at ambient temperature. In a hot/ambient version of the PP test, one plate of the spacer is held at ambient temperature, the other plate being held at 800° C., the alumina fibre layer of the mat being adjacent the hot plate.

Shape Retention Test

Mat segments are tested for their rigidity when moulded into an arcuate shape by measuring the radius of the arc of the freestanding segment.

Example 1

A laminate mat was manufactured as described above by joining an alumina fibre mat (for example a SAFFIL® E200 alumina fibre mat available from Saffil Automotive Limited, UK) having a basis weight of around 1000 gm$^{-2}$ and a needled silica fibre mat having an average basis weight of around 4000 gm$^{-2}$ and an average thickness of around 25 mm.

The mat was subjected to the thermal conductivity test, having the alumina silica layer adjacent the hot platen. The temperature at the interface of the alumina silica layer and the silica layer was 605° C. The temperature at the interface of the silica layer and the unheated platen was 160° C., well below 200° C.

The following Examples demonstrate the efficacy of different adhesive regimes. The mats of Examples 2, 3 and 4 were manufactured as described in Example 1 above, using adhesives as described. Each was subjected to the Tensile Strength test Example 2

25 w/w % aqueous PVA solution was used as an adhesive and applied to the alumina silica layer in a 16 dot matrix at 0.04 ml per dot. The silica fibre layer was then added to create the laminate mat, which was then pressed in a hot press at 180° C. until the temperature at the interface between the layers reached 140° C. at 0.2 GBD, around 6 to 8 minutes.

The resulting cured laminate mat was handleable and could be loaded into a can with a monolith by stuffing and clamshell type methods. The mat was found to tear in the silica fibre layer only when the tensile force applied exceeded 30 N.

Example 3

1 w/w % aqueous PVA solution, made by dissolving thermoplastic PVA flakes in water, was used as an adhesive and applied to the alumina silica layer in a 16 dot matrix at 0.04 ml per dot. The silica fibre layer was then added to create the laminate mat, which was then pressed in a hot press at 180° C. until the temperature at the interface between the layers reached 140° C. at 0.2 GBD, around 6 to 8 minutes.

The resulting cured laminate mat was handleable and could be loaded into a can with a monolith by stuffing and clamshell type methods. The mat was found to tear in the silica fibre layer only when the tensile force applied exceeded 30 N.

Example 4

A single layer of BOSTIK™ 30 gsm adhesive webbing was placed between the alumina silica and silica fibre layers as an adhesive. The laminate was then placed in a hot press at 180° C. until the temperature at the interface between the layers reached 140° C. at 0.2 GBD, around 4 minutes.

The resulting cured laminate mat was handleable and could be loaded into a can with a monolith by stuffing and clamshell type methods. The mat was found to not tear when the tensile force exceeded 30 N. This appeared to be because the cured adhesive elongated with the mat.

Examples 5 TO 11

Mats made according to Example 1 were tested according to the Pressure Performance test, yielding the following results:

| Example | FGBD (gcm$^{-3}$) | % RGE | 2500 cycle holding pressure (KPa) |
|---|---|---|---|
| 5 | 0.4 | 4 | 127.8 (Hot/ambient) |
| 6 | 0.4 | 8 | 57.2 (Hot/ambient) |
| 7 | 0.4 | 10 | 37.08 (Hot/ambient) |
| 8 | 0.4 | 4 | 149.85 (Ambient) |
| 9 | 0.4 | 6 | 87.37 (Ambient) |
| 10 | 0.3 | 4 | 67.55 (Ambient) |
| 11 | 0.3 | 6 | 51.16 (Ambient) |

The results show excellent holding pressures after 2500 cycles. The graphs shown in FIGS. 3 to 5 show the variation in holding pressure across the cycles of the Pressure Performance test. These graphs show that all Examples 5 to 11 show a relatively constant holding pressure after an initial drop following the first few titles.

Example 12

2700 gm$^{-2}$ moulded mat segments were manufactured by slurrying 6.75 parts by weight alumina fibres with 1 part by weight of a binder composition, the binder comprising 27 w/w % Al sol (AlSol 520 (20 w/w % alumina solids) available from Marybeni) and 73 w/w % latex binder (Dicrylan AC available from Huntsman) in an arcuate mould having an internal radius of 210 mm and a thickness of 20 mm. The solvent was driven off and the mat was cured to give curved mat segments.

The mat segments had a thickness of 26 mm, a freestanding radius of 270 mm and a Pressure Performance of 76.8 kPa.

Example 13

Moulded mat segments were made according to Example 12, but having a reduced quantity of latex in the binder solution.

The mat segments had a thickness of 24 mm, a freestanding radius of 240 mm and a Pressure Performance of 88.6 kPa.

Example 14

Moulded mat segments were made according to Example 12, but having 53 w/w % Al sol in the binder composition.

The mat segments had a thickness of 27 mm, a freestanding radius of 270 mm and a Pressure Performance of 81.6 kPa.

Example 15

Moulded mat segments were made according to Example 14, but having a reduced quantity of latex in the binder solution.

The mat segments had a thickness of 21 mm, a freestanding radius of 220 mm and a Pressure Performance of 94.4 kPa.

Example 16

Moulded mat segments were slurried according to Example 12, but including 80 w/w % alumina fibres and 20 w/w % silica fibres, and moulded in a mould having an internal radius of 152 mm and a thickness of 100 mm.

The mat segments had a thickness of 103 mm, a freestanding radius of 152 mm and a Pressure Performance of 87.4 kPa.

While mats according to the present invention may be used in catalytic convertors and diesel particulate filters as described above, it is understood by persons skilled in the art that such mats may also be used in insulation applications, whether automotive or otherwise, e.g. in furnace insulation.

No doubt many other effective alternatives will occur to the skilled person. It will be understood that the invention is not limited to the described embodiments and encompasses modifications apparent to those skilled in the art lying within the spirit and scope of the invention.

The invention claimed is:

1. A mat for mounting a monolith, the mat comprising a first inorganic fibre layer, where the mat has a front edge forming a gas facing edge in use, a rear edge opposite thereto and side edges extending between the front and rear edges, wherein the first inorganic fibre layer at a first side edge of the mat, and/or at a second side edge of the mat is cut at an acute angle to the thickness direction of the mat to provide a substantially trapezoidal cross section.

2. A mat according to claim 1 comprising a second inorganic fibre layer wherein at least a part of a major surface of the first layer is bonded to at least a part of a major surface of the second layer.

3. A mat according to claim 2, wherein the second layer at the first side edge of the mat, and/or the second layer at the second side edge of the mat is cut at an acute angle to the thickness direction of the mat to provide a substantially trapezoidal cross section.

4. A mat according to claim 3, wherein the sum of the cut angles of the second layer at the first and/or second side edges of the mat is 60° to 80°, optionally 70° to the thickness direction of the mat.

5. A mat according to claim 2, further comprising a third layer and optionally a fourth layer of inorganic fibres.

6. A mat according to claim 2, wherein the first layer has a basis weight of around 1000 to 5000 g/m² and the second layer has a basis weight of around 1000 to 7000 g/m², where the basis weight of the first layer may be the same as or different from the basis weight of the second layer.

7. A mat according to claim 2, wherein the first and second layers are bonded to each other by securing means.

8. A mat according to claim 7, wherein the securing means extends from the front edge to the rear edge of the mat.

9. A mat according to claim 7, wherein the securing means comprises an adhesive, optionally an organic binder, a polyvinyl acetate, a pressure sensitive adhesive, an adhesive web, a polyester based thermoplastic web with a melting point in the range of 110–130° C., a starch, a polymerisable material, a heat polymerisable material, an acrylate, a cross-linkable acrylate, and/or a saccharide.

10. A mat according to claim 9, wherein the adhesive is arranged in a plurality of regions between the major surfaces of the first and second layers.

11. A mat according to claim 9, wherein the adhesive has a shear strength over an area of 25 cm² of at least 4N, optionally at least 8N, further optionally between 8N and 30 N.

12. A mat according to claim 2, wherein the first and second layers are secured to each other by needling.

13. A mat according to claim 2, wherein the interface between the major surfaces of the layers is smaller than one or both of the major surfaces, optionally wherein the first layer and the second layer are offset with respect to one another, further optionally in the canning direction and/or in the wrapping direction.

14. A mat according to claim 2, wherein at least one of the major surface areas of the second layer is at least equal to, or greater than at least one of the major surface areas of the first layer, optionally wherein the width of the second layer is greater than the width of the first layer.

15. A mat according to claim 14, wherein the first layer and the second layer are, at rest, discontinuously in contact, optionally wherein the second layer is attached to the first layer such that the mat forms a bow shape.

16. A mat according to claim 14, wherein the first layer is divided into a plurality of pieces, optionally wherein the pieces of the first layer comprise a recessed portion for receiving a corresponding projected portion of an adjacent piece or a projecting portion for being received in a corresponding recessed portion of an adjacent piece.

17. A mat according to claim 14, wherein the first layer is attached to the second layer at one side edge, the other side edge being unattached; optionally wherein the mat comprises attachment means for attaching the first layer to the second layer at the other side edge, optionally to create a bow shaped mat, prior to installation; further optionally wherein the attachment means comprises a portion of adhesive tape or a region of adhesive on the first and/or second layer, optionally covered with a removable tab or release liner.

18. A mat according to claim 2, wherein the ratio of the thickness of the first layer to the second layer is 1-10:10-1.

19. A mat according to claim 2, wherein the first side edge of the first layer and/or the second layer of the mat and/or the second side edge of the first layer and/or the second layer of the mat opposite the first side edge is cut at an acute angle to the thickness direction of the mat to give the mat and/or either or both of the first layer or second layer a trapezoidal cross section.

20. A mat according to claim 19, wherein the sum of the cut angles at the first and/or second side edges of the mat is 60° to 80° to the thickness direction of the mat.

21. A mat according to claim 1, wherein the sum of the cut angles of the first layer at the first and/or second side edges of the mat is between 0° and 90°, optionally from 60° to 80°, further optionally 70° to the thickness direction of the mat.

22. A mat according to claim 1 having a basis weight of 3000 to 10000 g/m².

23. A mat according to claim 1, wherein intended front and/or rear edges of the first and/or second layers, if present, of the mat are stepped, shaped, and/or cut such that at least a portion of the front edge of the mat effectively protrudes from the mat and/or at least a portion of the rear edge of the mat effectively recedes from the mat, optionally wherein the first and/or second layers are stepped such that the first and second layers are offset with respect to one another in the intended axial direction.

24. A mat according to claim 23, wherein the intended front and/or rear edges of the first and/or second layers, if present, of the mat are slant cut to provide a substantially trapezoidal cross section.

* * * * *